United States Patent
Vera et al.

(10) Patent No.: US 7,600,145 B2
(45) Date of Patent: Oct. 6, 2009

(54) CLUSTERED VARIATIONS-AWARE ARCHITECTURE

(75) Inventors: Xavier Vera, Barcelona (ES); Oguz Ergin, Ankara (TR); Osman Unsal, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/562,189

(22) PCT Filed: Oct. 26, 2005

(86) PCT No.: PCT/ES2005/070152

§ 371 (c)(1),
(2), (4) Date: Oct. 9, 2007

(87) PCT Pub. No.: WO2007/048859

PCT Pub. Date: May 3, 2007

(65) Prior Publication Data

US 2008/0028252 A1    Jan. 31, 2008

(51) Int. Cl.
    G06F 1/04    (2006.01)
(52) U.S. Cl. .................. 713/503; 713/400; 713/501
(58) Field of Classification Search .......... 713/322, 713/400–501, 503, 600–601
See application file for complete search history.

(56) References Cited

U.S. PATENT DOCUMENTS

| | | | |
|---|---|---|---|
| 6,047,248 A * | 4/2000 | Georgiou et al. ............ 702/132 |
| 6,518,782 B1 | 2/2003 | Turner | |
| 6,809,538 B1 | 10/2004 | Borkar | |
| 6,842,714 B1 | 1/2005 | Acar et al. | |
| 7,245,684 B2 * | 7/2007 | Adkisson ..................... 375/359 |
| 2003/0071657 A1 * | 4/2003 | Soerensen et al. ............. 326/93 |
| 2004/0017234 A1 | 1/2004 | Tam et al. | |
| 2004/0104740 A1 | 6/2004 | Burns et al. | |
| 2006/0136763 A1 * | 6/2006 | Jorgenson et al. ........... 713/322 |
| 2008/0244278 A1 | 10/2008 | Monferrer et al. | |

FOREIGN PATENT DOCUMENTS

| WO | WO-0026747 A1 | 5/2000 |
|---|---|---|
| WO | WO-2004066092 A2 | 8/2004 |
| WO | WO-2004084070 A1 | 9/2004 |
| WO | WO-2008000858 A1 | 1/2008 |

OTHER PUBLICATIONS

"English Translation of the Relevant Portion of the International Search Report on PCT / ES 2006/070093", (Jan. 26, 2007), 6 pgs.

Uht, Augustus K., "Achieving Typical Delays in Synchronous Systems via Timing Error Toleration", *University of Rhode Island, Dept. of Electrical Computer Engineering Technical Report No. 032000-0100*, (Mar. 10, 2000), 21 pages.

(Continued)

*Primary Examiner*—Dennis M Butler
(74) *Attorney, Agent, or Firm*—Caven & Aghevle LLC (57) ABSTRACT

Methods and apparatus to provide a clustered variations-aware architecture are described. In one embodiment, one or more variations within a clock domain are detected and utilized to adjust a clock signal of the clock domain.

27 Claims, 7 Drawing Sheets

OTHER PUBLICATIONS

Qiang, W. et al., "Voltage and Frequency Control With Adaptive Reaction Time in Multi-Clock-Domain Processors", *High-Performance Computer Architecture, HPCA-11*, 11th International Symposium on San Francisco, (Feb. 2005), pp. 178-189.

*International Search Report and Written opinion for application No. PCT/ES2005/070152 mailed on May 12, 2006*, 12 pgs.

*International search report for application No. PCT/ES 2006/070093 dated Jan. 26, 2007*.

Donald, James, et al., "Adjusting Leakage Power of Caches", (*Intel Ref: P23175*) *Filed Feb. 24, 2006 assigned U.S. Appl. No. 11/361,767*.

Ernst, et al., "Razor: A Low-Power Pipeline Based on Circuit-Level Timing Speculation", *Proceedings of the 36th Annual IEEE/ACM International Symposium on Microarchitecture*, (Dec. 3-5, 2003), 7-18.

Juang, Philo, "Implementing Decay Techniques using 4T Quasi-Static Memory Cells", 4 pages.

Kaxiras, Stefanos, "Cache Decay: Exploiting Generational Behavior to Reduce Cache Leakage Power", 12 pages.

Lu, Zhijian, "Reducing Multimedia Decode Power using Feedback Control", 8 pages.

Unsal, et al., "Impact of Parameter Variations on Circuits and Microarchitecture", *IEEE Micro*.vol. 26(6), (Nov.-Dec. 2006), 30-39.

Borkar, Shekhar, et al., "Parameter Variations and Impact on Circuits and Microarchitecture", *DAC 2003*, Copyright 2003 ACM 1-58113-688-9/06/0006,(Jun. 2-6, 2003), 338-342.

Brooks, David et al., "Dynamically Exploiting Narrow Width Operands to Improve Processor Power and Performance", *Fifth International Symposium on High-Performance Computer Architecture (HPCA-5)*,, (Jan. 1999), 10 pages.

Ernst, Dan, et al., "Razor: A Low-Power Pipline Based on Circuit-Level Timing Speculation", *Proceedings of the 36th International Symposium on Microarchitecture (MICRO-36'03)*, 12 pages.

Iyer, Anoop, et al., "Power and Performance Evaluation of Globally Asynchronous Locally Synchronous Processors", *International Conference on Computer Architecture Proceedings of the 29th annual international symposium on Computer architecture*, (2002), 158-168.

Magklis, Grigorios, et al., "A Frequency and Voltage Scaling Architecture", *Intel Ref #: P20449; Application Filed: Nov. 29, 2004; U.S. Appl. No. 10/999,786*, 19 pgs.

Magklis, Grigorios, et al., "Frontend Frequency-Voltage Adaptation for Optimal Energy-Delay", *22nd IEEE International Conference on Computer Design: VLSI in Computers & Processors (ICCD 2004), San Jose, CA, USA, Proceedings. IEEE Computer Society 2004*, (Oct. 11-13, 2004), 250-255.

Restle, Phillip J., et al., "Timing Uncertainty Measurements on the Power5 Microprocessor", *2004 IEEE International Solid-State Circuits Conference*, ISSCC 2004/ Session 19/ Clock Generation and Distribution/19.7, (2004),8 pages.

Semeraro, Greg, et al., "Energy-Efficient Processor Design Using Multiple Clock Domains with Dynamic Voltage and Frequency Scaling", *Proceedings of the 8th International Symposium on High-Performance Computer Architecture*, (2002), 12 pages.

Unsal, Osman, et al., "System and Method for Exploiting Timing Variability", *Intel Ref #:P21398; Application Filed: Jun. 20, 2005, U.S. Appl. No. 11/157, 320.*, 31 pgs.

\* cited by examiner

CLUSTERED VARIATIONS-AWARE ARCHITECTURE

BACKGROUND

The present disclosure generally relates to the field of electronics. More particularly, an embodiment of the invention relates to a clustered architecture that is aware of variations.

Typically, a processor's clock frequency is set according to the critical path (worst-case) delay plus safety margins due to the magnitude of semiconductor manufacturing process (P), operating voltage (V), temperature (T), and input vectors or values (I) variations (PVTI). Generally, PVTI-related variations increase with technology scaling and, as a result, safety margins are becoming a more dominant component in determining a processor's clock.

Also, as the magnitude of PVTI variations grows, safety margins may have an increasing impact on a processor's performance. First, circuit verification may be more complex since variations may transform non-critical paths into critical path. Second, the clock frequency may have to be set to lower values to ensure correctness of processing results, which may have a cost implication. For example, low performance parts may need to be discarded which may increase costs.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
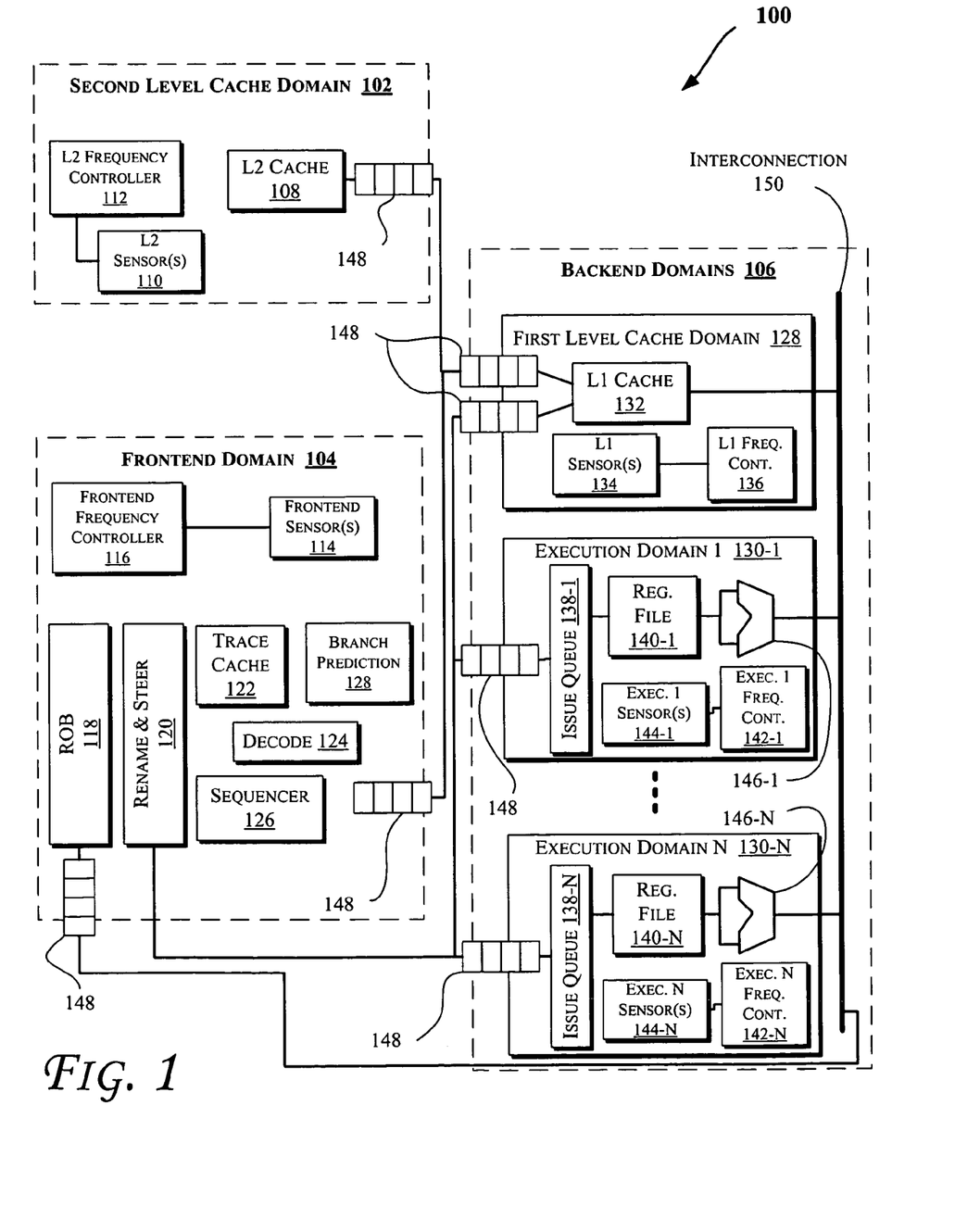
FIG. 1 illustrates a block diagram of a clustered architecture, according to an embodiment.

Some of the embodiments discussed herein may provide a clustered architecture (e.g., an architecture with multiple clock domains) that is aware of one or more PVTI variations, such as the architectures discussed with reference to FIGS. 1-7. More particularly, FIG. 1 illustrates a block diagram of a clustered architecture 100, according to an embodiment. In one embodiment, the architecture 100 may represent logical components within a processor or number of processors (such as those discussed with reference to FIGS. 5 and 6). The architecture 100 may include one or more domains such as a second level cache domain 102, a frontend domain 104, and one or more backend domains 106, whose clock frequencies may be adjusted in response to variations detected based on sensor data and/or number of errors detected in the given clock domain. This may reduce the per cluster (or per clock domain) variations. The variations may be one or more of a semiconductor manufacturing process variation, operating voltage variation, temperature variation, and/or input vector or value variation. Also, each of the domains (e.g., 102, 104, and 106) may include more or less components than those shown in FIG. 1 in various embodiments.

The second level (L2) cache domain 102 may include an L2 cache 108 (e.g., to store date including instructions), one or more L2 sensors 110, and an L2 frequency controller 112. The L2 sensors 110 may correspond to one or more components of the L2 cache domain 102 (e.g., the L2 cache 108) to sense one or more variations within the domain 102. As shown in FIG. 1, the L2 sensors 110 are coupled to the L2 frequency controller 112 to inform the L2 frequency controller 112 of any variations present in the L2 cache domain 102. Variations may also be detected based on the number of errors detected within the L2 cache domain 102. The L2 frequency controller 112 may utilize the detected variations to adjust a clock signal for the components of the L2 cache domain 102. Hence, the L2 frequency controller 112 may enable the components of the L2 cache domain 102 to adapt to changing variations. In one embodiment, the L2 cache 108 may be shared by multiple cores in a multi-core processor such as those discussed with reference to FIGS. 5 and 6. Also, the L2 cache 108 may be off of the same die as the processor cores. Accordingly, in various embodiments of the invention, a processor may include the domains 104 and 106, and may or may not include the L2 cache 108.

As shown in FIG. 1, the frontend domain 104 may include one or more frontend sensors 114, a frontend frequency controller 116, a reorder buffer 118, a rename and steer unit 120, a trace cache 122, a decode unit 124, a sequencer 126, and/or a branch prediction unit 128. In one embodiment, the frontend domain 104 may include other components such as an instruction fetch unit or the like. The frontend sensors 114 may correspond to one or more components of the frontend domain 104 to sense one or more variations within the frontend domain 104. The sensors 114 are coupled to the frequency controller 116 to inform the frequency controller 114 of any variations present in the frontend domain 104. Variations may also be detected based on the number of errors detected within the frontend domain 104. The frontend frequency controller 116 may utilize the detected variations to adjust a clock signal for the components of the frontend domain 104. Hence, the frequency controller 116 may enable the components of the frontend domain 104 to adapt to changing variations.

The backend domains 106 may include one or more of a first level (L1) cache domain 128 and one or more execution domains 130-1 through 130-N. The L1 cache domain 128 may include an L1 cache 132 (e.g., to store data including instructions), one or more L1 sensors 134, and an L1 frequency controller 136. The L1 sensors 134 may correspond to one or more components of the L1 cache domain 128 (e.g., the L1 cache 132) to sense one or more variations within the domain 128. As shown in FIG. 1, the L1 sensors 134 are coupled to the L1 frequency controller 136 to inform the frequency controller 136 of any variations present in the L1 cache domain 128. Variations may also be detected based on the number of errors detected within the L1 cache domain 128. The L1 frequency controller 136 may utilize the detected variations to adjust a clock signal for the components of the L1 cache domain 128. Hence, the L1 frequency controller 136 may enable the components of the L1 cache domain 128 to adapt to changing variations.

The execution domains 130-1 through 130-N may be any suitable execution unit such as an integer execution unit and/or a floating point execution unit. The execution domains 130-1 through 130-N may each comprise an issue queue (138-1 through 138-N, respectively), a register file (140-1 through 140-N, respectively), an execution domain frequency controller (142-1 through 142-N, respectively), one or more execution domain sensors (144-1 through 144-N, respectively), and/or an execution unit (146-1 through 146-N, respectively).

In one embodiment, each of the domains 102, 104, and 106 may include one or more first-in, first-out (FIFO) buffer(s) 148 to synchronize communication between the various clock domains (e.g., between the domains 102, 104, and/or 106). In an embodiment, the FIFO buffers 148 may be clocked by utilizing the receiving domain's clock (e.g., clock that is generated by the respective frequency controller).

The architecture 100 (and, in an embodiment, such as the one shown in FIG. 1, the backend domains 106) may include an interconnection or bus 150 to facilitate communication between various components of the architecture 100. For example, after an instruction is successfully executed (e.g., by the execution domains 130-1 through 130-N), the instruction commit may be communicated to the ROB 118 (e.g., via the interconnection 150) to retire that instruction. Additionally, the domains within the backend (e.g., domains 128 and 130-1 through 130-N) may communicate via the interconnection 150. For example, communication among execution units (130-1 through 130-N) may occur for type conversion instructions.

Figure 2:
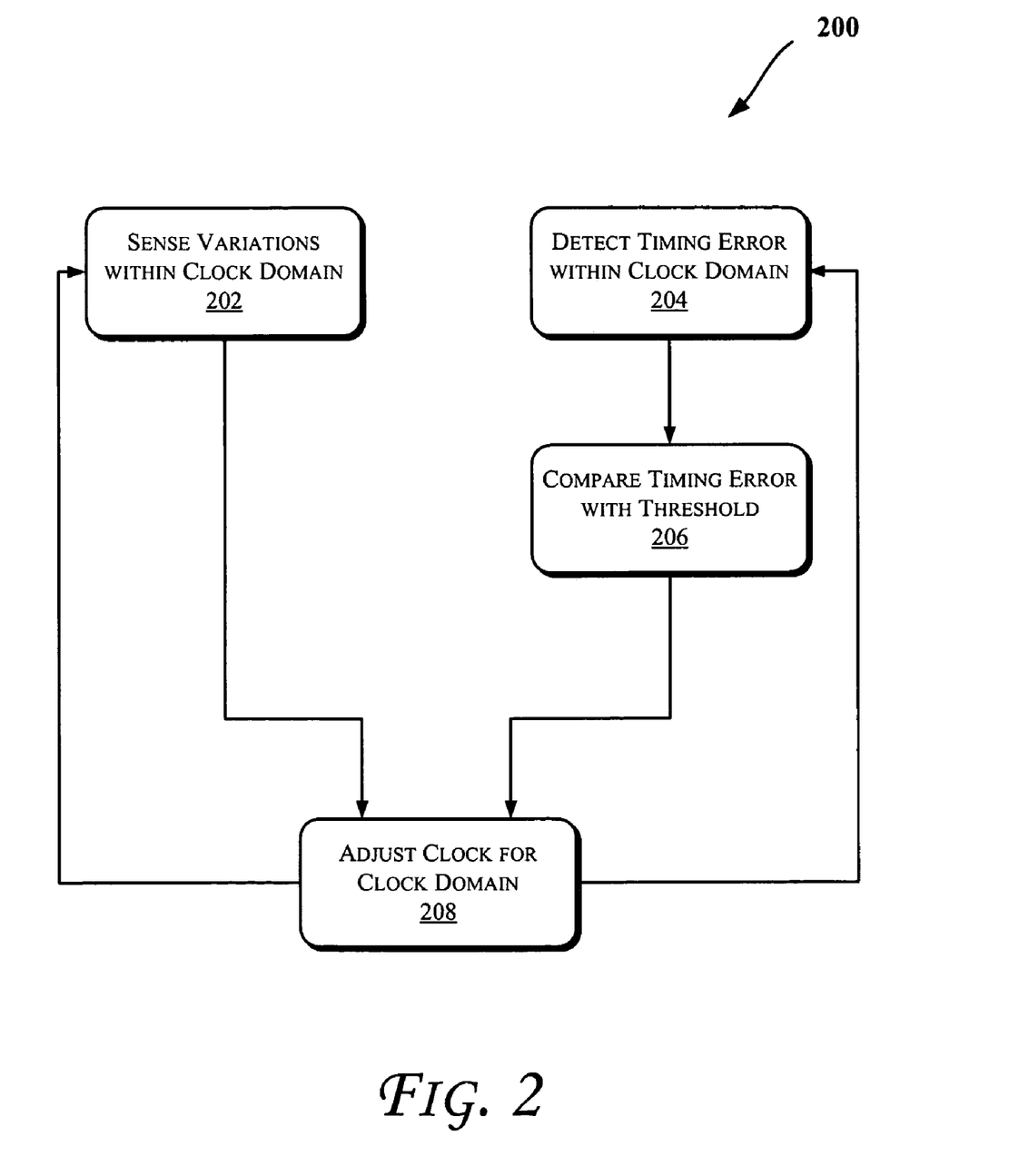
FIG. 2 illustrates a flow diagram of a method to adjust a clock signal of a clock domain in response to the one or more variations, according to an embodiment.

FIG. 2 illustrates a flow diagram of a method 200 to adjust a clock signal of a clock domain in response to the one or more variations, according to an embodiment. In one embodiment, the operations of the method 200 may be performed by one or more components of a processor, such as the components discussed with reference to FIG. 1.

Referring to FIGS. 1-2, one or more sensors (e.g., sensors 110, 114, 136, and/or 144-1 through 144-N) may sense variations (such as the variations discussed with reference to FIG. 1) within a clock domain (for example, domains 102, 104, and/or 106) at operation 202. These sensors could be, but are not limited to, one or more temperature sensors, voltage droop probes, and/or ring oscillators. At operation, 204, a frequency controller (such as the frequency controllers 112, 116, 136, and 142-1 through 142-N) may detect one or more timing errors within the clock domain (for example, domains 102, 104, or 106, respectively), as will be further discussed with reference to FIGS. 3 and 4. In an embodiment, the operations 202 and 204 may be performed simultaneously.

Moreover, in one embodiment, each of the frequency controllers 112, 116, 136, and 142-1 through 142-N may include an error counter (e.g., to count the number of errors detected within a corresponding clock domain) and a cycle counter (not shown). Any suitable storage mechanism may be utilized to implement the error counter and cycle counter, such as a hardware register and/or a variable stored in a shared memory (e.g., the L2 cache 108 and/or L1 cache 132). The frequency controllers 112, 116, 136, and 142-1 through 142-N may also have access to a threshold value that may indicate the number of allowable errors for a given domain (e.g., expressed as a percentage of timing errors). The threshold value may be stored in any suitable storage mechanism, such as a hardware register and/or a variable stored in a shared memory (e.g., the L2 cache 108 and/or L1 cache 132). Also, the threshold value may be programmable in one embodiment.

Based on comparison of the values of the error counter and cycle counter against the threshold value (at operation 206) and/or the sensed variations (at operation 202), the frequency controllers 112, 116, 136, and 142-1 through 142-N may generate a clock signal for their respective domain components that is adjusted (208) in accordance with the variations detected in a respective domain (e.g., domains 102, 104, or 106, respectively). For example, the frequency controllers 112, 116, 136, and 142-1 through 142-N may increase the frequency of their generated clock if the timing error within the respective clock domain (e.g., domains 102, 104, or 106, respectively) is lower than the threshold value (206). Conversely, the frequency controllers 112, 116, 136, and 142-1 through 142-N may decrease the frequency of their generated clock if the timing error within the respective clock domain (e.g., domains 102, 104, or 106, respectively) exceeds the threshold value (206). After the operation 208, the method 200 may resume at operations 202 and 204 to continue detecting variations within the clock domain.

Accordingly, in an embodiment, each domain (e.g., domains 102, 104, and 106) may be running at a clock frequency that may be different from the clock frequency of the other domains. This may enable each domain to adapt to changing variations through a product's life, e.g., to reduce the aging problem associate with semiconductor devices and/or reduce verification costs. Also, this may reduce the impact of within-die variations and may improve performance by adapting the frequency of each domain to the dynamic variations that domain may be experiencing. Moreover, each domain may have a different sensitivity to the number of errors; thus, a different frequency controller for each domain may optimize overall performance of an architecture (100). Further, in one embodiment, the frequency controllers 112, 116, 136, and 142-1 through 142-N may generate their clock based on one reference clock signal. For example, the frequency controllers 112, 116, 136, and 142-1 through 142-N may adjust the frequency of a reference clock (e.g., a system-wide clock) in an embodiment. Therefore, the domains (102-106) may be dependent upon a reference clock signal. Alternatively, different reference clocks may be utilized by the frequency controllers 112, 116, 136, and 142-1 through 142-N to generate their respective domain clock.

Figure 3:
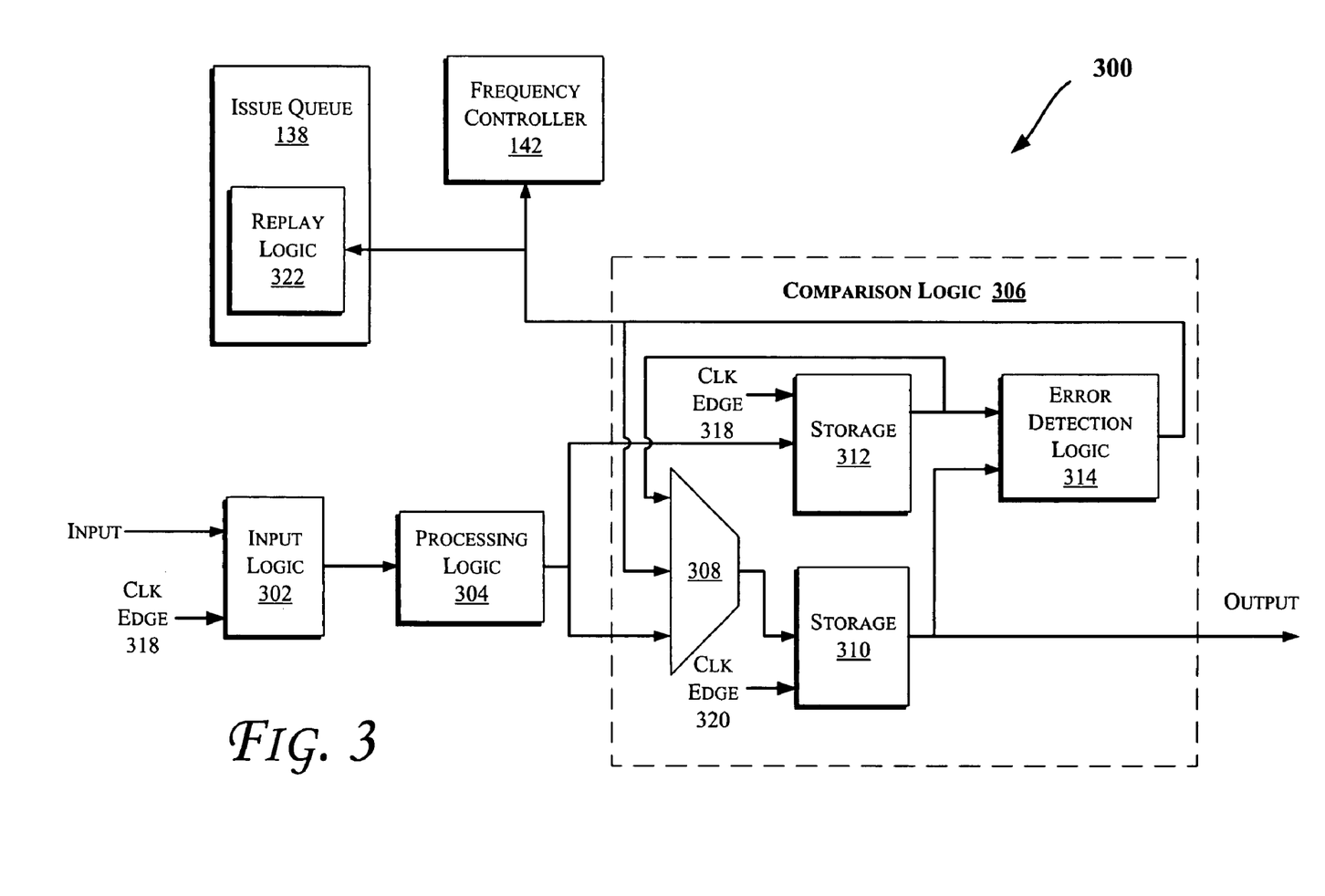
FIG. 3 illustrates a block diagram of a pipeline stage of a processor, according to an embodiment.

FIG. 3 illustrates a block diagram of a pipeline stage 300 of a processor, according to an embodiment. The pipeline stage 300 may be utilized to execute instructions speculatively, e.g., to increase performance and/or reduce latency. In an embodiment, each of the execution 146-1 through 146-N of FIG. 1 may include one or more of the pipeline stage 300. The pipeline stage 300 may include an input logic 302, a processing logic 304, and a comparison logic 306. Comparison logic 306 may further include a selection logic 308 (which may be a multiplexer in an embodiment), a first storage unit 310, a second storage unit 312, and an error detection logic 314.

Input logic 302 may receive input data (including instructions) that are to be processed by processing logic 304, and the output values produced by the processing logic may be stored in the first storage unit 310 through selection logic 308, and to second storage unit 312. In one embodiment of the invention, first storage unit 310 and second storage unit 312 are latches. Moreover, the first and second latches (310 and 312, respectively) may store a logical value presented to their inputs with enough setup and hold time to be latched by a clock signal. Furthermore the first and second latches (310 and 312, respectively) may output a logical value when triggered by a clock signal and thereafter maintain their stored value for a subsequent circuit to receive until a new value is presented to the latches with enough setup and hold time to be latched by a clock signal.

In an embodiment, the latches (310 and 312) are triggered by a rising and falling edges of a clock signal (or vice versa), such as those generated by the frequency controllers 142-1 through 142-N of FIG. 1. For example, as shown in FIG. 3, clock edges 318 and 320 may be utilized to synchronize the storage units 310 and 312. For example, the edges 318 and 320 may be the rising and falling edges of the same clock signal, or vice versa.

In one embodiment, the first storage unit 310 stores the output of the processing logic 304 and provides the output to a subsequent pipeline stage so that the subsequent pipeline stage may speculatively process the output of the processing logic 304. The second storage unit 312 may store the most recent output of the processing logic 304, which in some embodiments may correspond to the correct or expected output (e.g., worst case delay output).

Furthermore, the error detection logic 314 may compare the values stored in first storage unit 310 and second storage unit 312 in order to detect the occurrence of an error in the output of the pipeline stage 300. Error detection logic 314 may also provide an error signal to selection logic 308. Therefore, while an error in the output of the pipeline stage is not detected, selection logic 308 provides the output of processing logic 304 to first storage unit 310. However, if an error in the output of the pipeline stage 300 is detected, selection logic 308 provides the value stored in second storage unit 312 to first storage unit 310, in one embodiment.

As shown in FIG. 3, the error detection logic 314 may provide its generated error signal to the issue queue 138 (which may be one of the issue queues 138-1 through 138-N of FIG. 1). The issue queue 138 may include a replay logic 322 to cause re-execution of one or more corresponding consumer instructions if the speculative output is different than the expected output. Also, the error detection logic 314 may provide its generated error signal to the frequency controller 142 (which may be one of the frequency controllers 142-1 through 142-N of FIG. 1) to enable the frequency controller 142 to determine the timing error within the clock domain (such as discussed with reference to operation 204 of FIG. 2).

In one embodiment, a processor that includes the pipeline stage 300 may leverage common-case delay by latching values speculatively. When the worse-case conditions arise, the errors are detected and one or more of the consumers may be re-executed (since the consumers have been issued based on the common-case delay) to provide for a correct result. When the number of errors is above a threshold value (such as discussed with reference to operation 206 of FIG. 2), the frequency of the given domain may be decreased.

Figure 4:
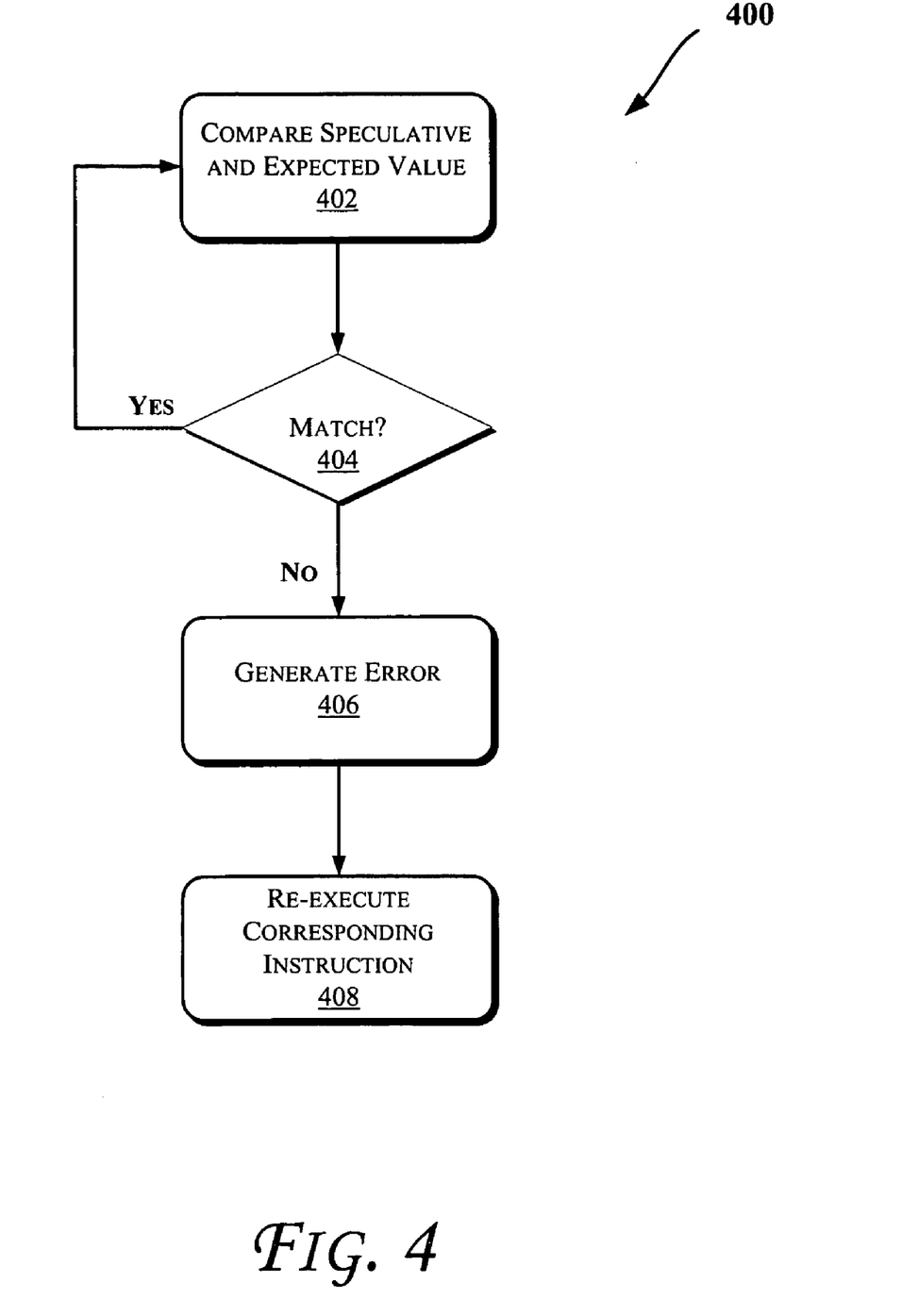
FIG. 4 illustrates a flow diagram of a method to determine whether to re-execute one or more consumers of a speculatively executed instruction, according to an embodiment.

FIG. 4 illustrates a flow diagram of a method 400 to determine whether to re-execute one or more consumers of a speculatively executed instruction, according to an embodiment. In one embodiment, the operations of the method 400 may be performed by one or more components of a processor, such as the components discussed with reference to FIGS. 1-3.

Referring to FIGS. 1-4, the error detection logic 314 may compare a speculative output of a pipeline stage (e.g., a value stored in the storage unit 310) with an expected output from the pipeline stage (e.g., a value stored in the storage unit 312) at operation 402. If there is a match (at operation 404), the method 400 may resume with the operation 402 to compare the next values. Otherwise, at operation 406, the error detection logic 314 may generate an error (that may be communicated to the frequency controller 142 and/or the issue queue 138). At operation 408, the issue queue 138 (and in one embodiment, the replay logic 322) may re-issue one or more consumers of the instruction that corresponds to the error.

In one embodiment, the issue queue 138 may issue an instruction for execution by the corresponding execution unit (e.g., one of the units 146-1 through 146-N) when all source operands are ready. In an embodiment, the issue queue 138 may keep that instruction for a select number of cycles in case the instruction producing the sources executes incorrectly (e.g., when the error detection logic 314 generates an error for the instruction at one of the stages of the execution unit). Moreover, the replay logic 322 may generate a signal to request re-execution of all instructions that depend on the instruction that generated the error (consumers). Hence, in an embodiment, after being issued, instructions are kept in the issue queue 138 until all their respective sources are guaranteed to be correct.

Figure 5:
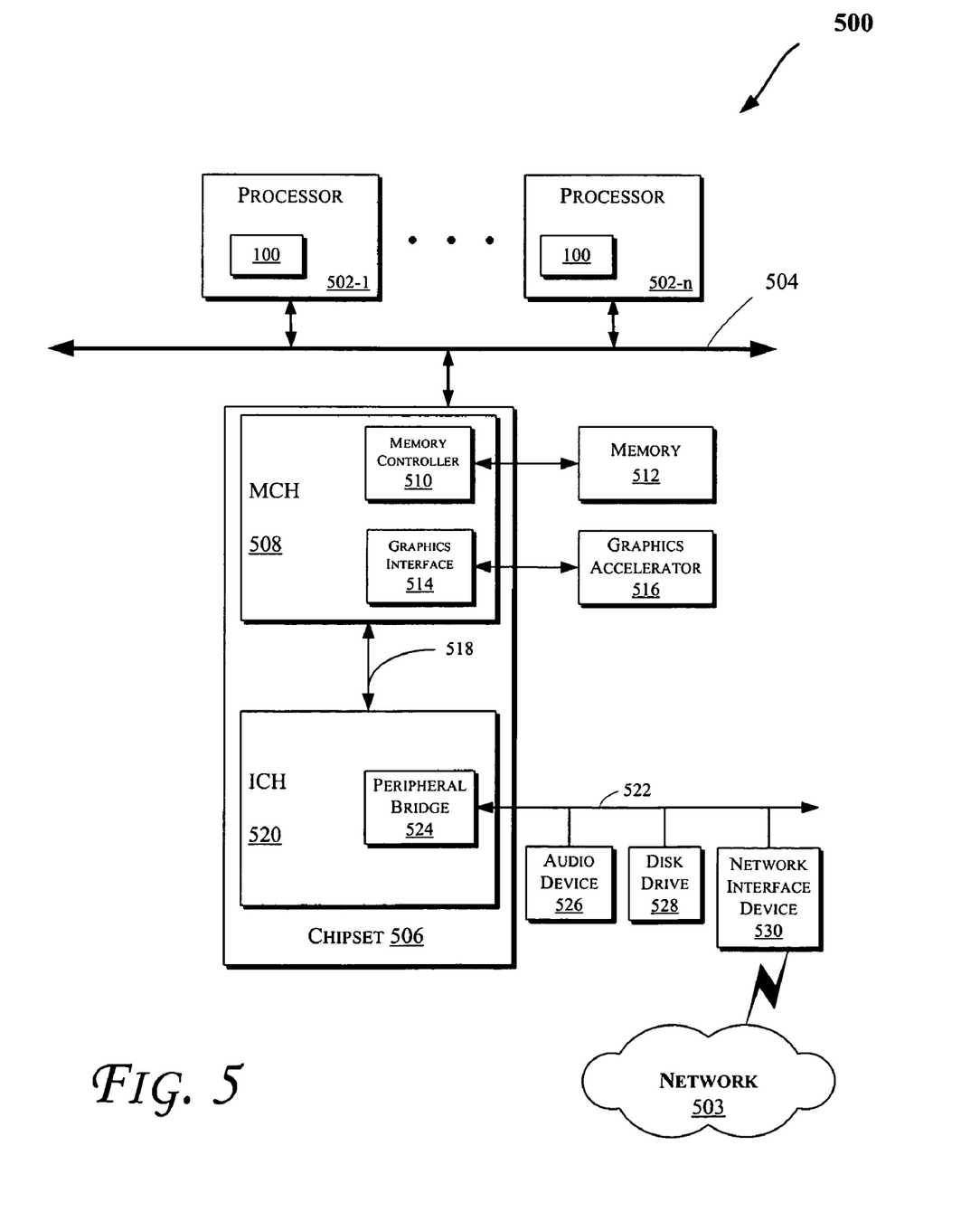
FIGS. 5 and 6 illustrate block diagrams of computing systems in accordance with various embodiments of the invention.

FIG. 5 illustrates a block diagram of a computing system 500 in accordance with an embodiment of the invention. The computing system 500 may include one or more central processing unit(s) (CPUs) 502 or processors coupled to an interconnection network (or bus) 504. The processors 502 may be any suitable processor such as a general purpose processor, a network processor (that processes data communicated over a computer network 503), or the like (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may utilize the embodiments discussed with reference to FIGS. 1-4. For example, one or more of the processors 502 may include one or more cores with multiple clock domains, and independent frequency controllers and/or variation sensors. Also, the operations discussed with reference to FIGS. 1-4 may be performed by one or more components of the system 500.

A chipset 506 may also be coupled to the interconnection network 504. The chipset 506 may include a memory control hub (MCH) 508. The MCH 508 may include a memory controller 510 that is coupled to a memory 512. The memory 512 may store data and sequences of instructions that are executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 504, such as multiple CPUs and/or multiple system memories.

The MCH 508 may also include a graphics interface 514 coupled to a graphics accelerator 516. In one embodiment of the invention, the graphics interface 514 may be coupled to the graphics accelerator 516 via an accelerated graphics port (AGP). In an embodiment of the invention, a display (such as a flat panel display) may be coupled to the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may couple the MCH 508 to an input/output control hub (ICH) 520. The ICH 520 may provide an interface to I/O devices coupled to the computing system 500. The ICH 520 may be coupled to a bus 522 through a peripheral bridge (or controller) 524, such as a peripheral component interconnect (PCI) bridge, a universal serial bus (USB) controller, or the like. The bridge 524 may provide a data path between the CPU 502 and peripheral devices. Other types of topologies may be utilized. Also, multiple buses may be coupled to the ICH 520, e.g., through multiple bridges or controllers. Moreover, other peripherals coupled to the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 522 may be coupled to an audio device 526, one or more disk drive(s) 528, and a network interface device 530 (which is coupled to the computer network 503). Other devices may be coupled to the bus 522. Also, various components (such as the network interface device 530) may be coupled to the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media suitable for storing electronic instructions and/or data.

Figure 6:
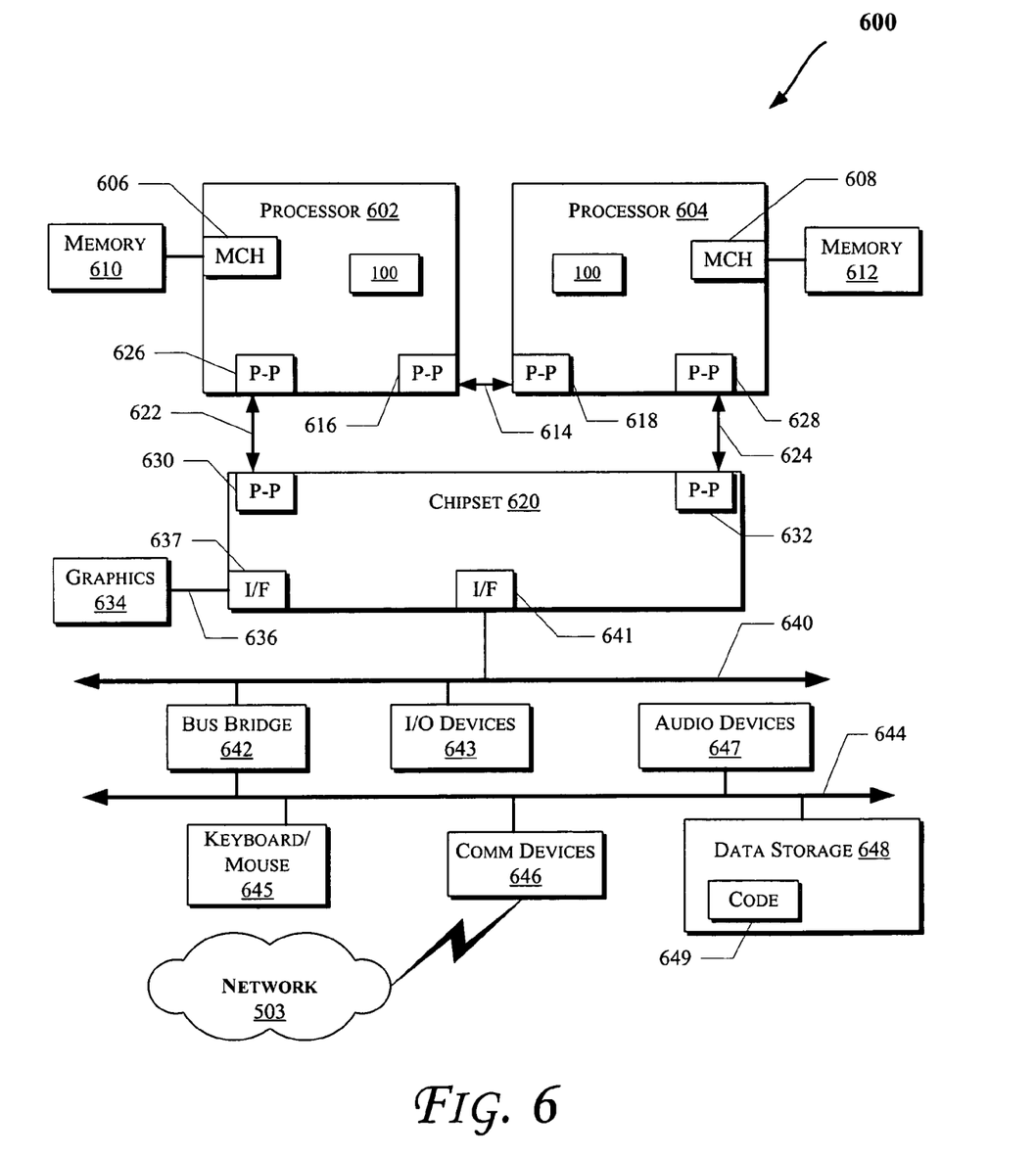

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to couple with memories 610 and 612. The memories 610 and/or 612 may store various data such as those discussed with reference to the memory 512.

The processors 602 and 604 may be any suitable processor such as those discussed with reference to the processors 502 of FIG. 5. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least one embodiment of the invention may be provided within the processors 602 and 604. For example, one or more of the clock domains discussed with reference to FIG. 1 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may be coupled to a bus 640 using a PtP interface circuit 641. The bus 640 may have one or more devices coupled to it, such as a bus bridge 642 and I/O devices 643. Via a bus 644, the bus bridge 643 may be coupled to other devices such as a keyboard/mouse 645, communication devices 646 (such as modems, network interface devices, or the like that may be coupled to the computer network 503), audio I/O device, and/or a data storage device 648. The data storage device 648 may store code 649 that may be executed by the processors 602 and/or 604.

Figure 7:
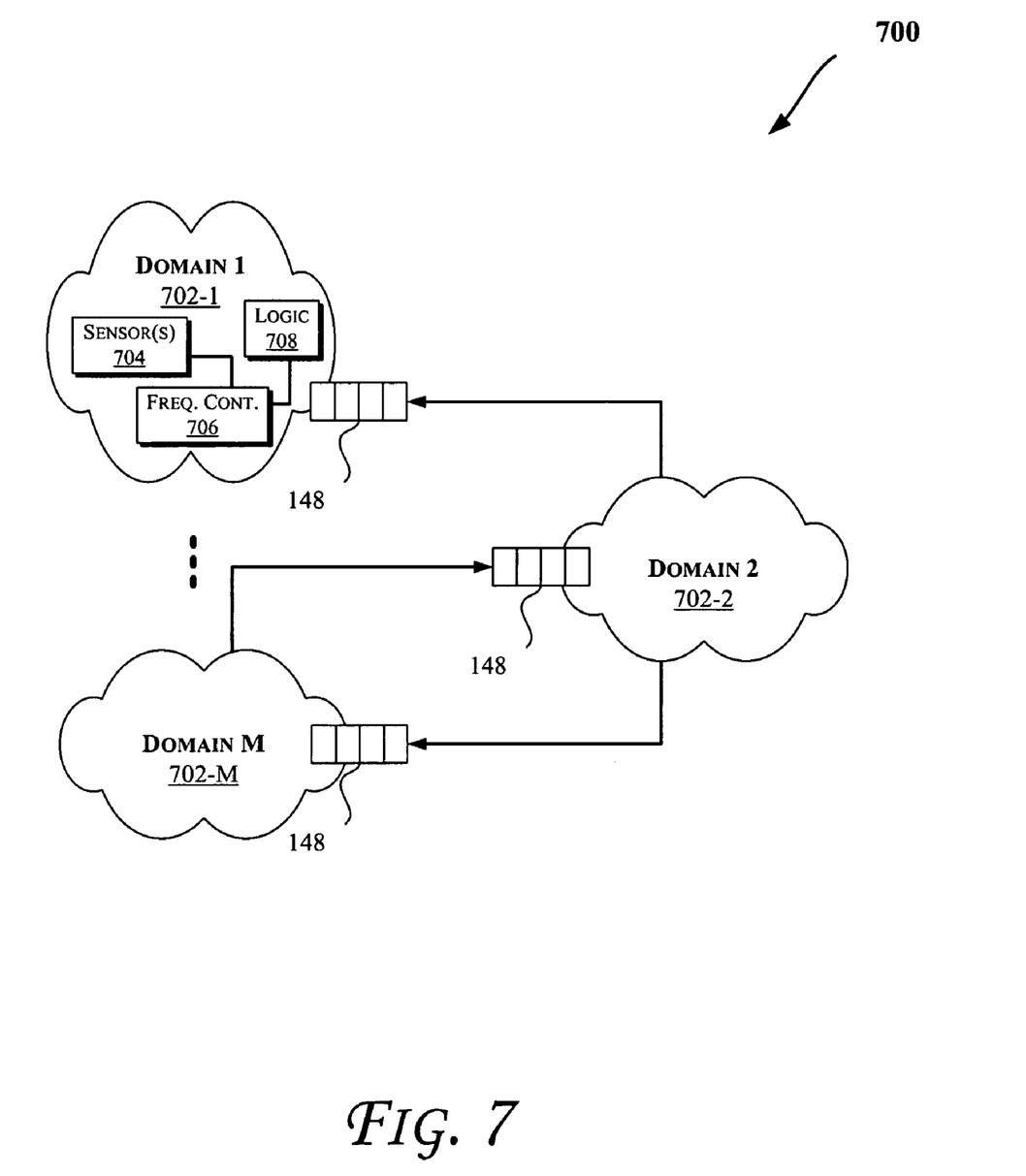
FIG. 7 illustrates a block diagram of a computing system, according to an embodiment.

FIG. 7 illustrates a block diagram of a computing system 700, according to an embodiment. The computing system 700 may include one or more domains 702-1 through 702-M. Each of the domains 702-1 through 702-M may include various components, but for clarity, sample components are only shown with reference to the domain 702-1. As illustrated in FIG. 7, each domain may include one or more sensors 704, a frequency controller 706, and logic 708. The sensors 704 may sense variations (such as those discussed with reference to FIG. 1) within the corresponding domain. In one embodiment, the sensors 704 may be coupled to one or more components of the corresponding cluster (e.g., logic 708 within the domain 702-1). The frequency controller 706 may be coupled to the sensors 704 and logic 708 and utilize sensed variations and/or timing errors to adjust the frequency of the clock signal used for the corresponding clock domain, such as discussed with reference to FIGS. 1-4. Hence, various components of the logic 708 may be clocked by a clock signal that is generated (or frequency-adjusted) by the frequency controller 706. In one embodiment, each of the domains 702-1 through 702-M may include one or more FIFO buffer(s) 148 to synchronize communication between the various clock domains (such as discussed with reference to FIG. 1). The logic 708 may provide suitable computing functionality such as data processing, data storage, data communication, or the like. Accordingly, the computing system 700 may be provided in any suitable computing device such as a personal digital assistant (PDA), a mobile phone, a laptop computer, a desktop computer, a server computer (including a server utilizing blade modules, also referred to as a "blade server"), a workstation, or the like. Furthermore, the computing system 700 may include one or more components of the systems 500 of FIG. 5 and/or 600 of FIG. 6 in various embodiments.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any suitable storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
   detecting one or more variations within a clock domain of a plurality of clock domains of a processor;
   adjusting a clock signal of the clock domain in response to the one or more variations;
   comparing a speculative output of a pipeline stage of the processor with a correct output of the pipeline stage of the processor; and
   determining whether the speculative output matches the correct output.

2. The method of claim 1, wherein detecting the one or more variations comprises sensing one or more of a semiconductor manufacturing process variation, operating voltage variation, temperature variation, or input value variation.

3. The method of claim 1, wherein adjusting the clock signal of the clock domain comprises adjusting a frequency of the clock signal.

4. The method of claim 1, wherein adjusting the clock signal is performed based on comparison of a threshold value with a number of timing errors detected in the clock domain.

5. The method of claim 1, further comprising synchronizing communication among the plurality of clock domains.

6. The method of claim 1, further comprising generating an error signal if the speculative output is different than the correct output.

7. The method of claim 1, further comprising re-executing one or more consumer instructions if the speculative output is different than the correct output.

8. An apparatus comprising:
   logic to detect one or more variations within a clock domain of a plurality of clock domains of a processor;
   a frequency controller to adjust a clock signal of the clock domain in response to the one or more variations; and
   a comparison logic to compare a speculative output of a pipeline stage of the processor with a correct output of the pipeline stage of the processor to determine whether the speculative output matches the correct output.

9. The apparatus of claim 8, wherein the logic to detect the one or more variations comprises one or more sensors.

10. The apparatus of claim 9, wherein the one or more sensors are one or more of a temperature sensor, a voltage droop probe, or a ring oscillator.

11. The apparatus of claim 8, wherein the logic to detect the one or more variations detects the one or more variations based on a number of detected errors within the clock domain.

12. The apparatus of claim 8, wherein the plurality of clock domains of the processor comprise one or more of a frontend domain, a backend domain, and a second level cache domain.

13. The apparatus of claim 12, wherein the frontend domain comprises one or more of a frontend sensor, a frontend frequency controller, a reorder buffer, a rename and steer unit, a trace cache, an instruction fetch unit, a decode unit, a sequencer, or a branch prediction unit.

14. The apparatus of claim 12, wherein the backend domain comprises one or more of a first level cache domain and one or more execution domains.

15. The apparatus of claim 14, wherein the first level cache domain comprises one or more of a first level cache, a first level cache frequency controller, or a first level cache sensor.

16. The apparatus of claim 14, wherein the one or more execution domains comprise one or more of an integer execution domain or a floating point execution domain.

17. The apparatus of claim 14, wherein each of the execution domains comprises one or more of an issue queue, a register file, an execution domain frequency controller, an execution domain sensor, or an execution unit.

18. The apparatus of claim 14, further comprising an interconnection to couple one or more of the first level cache domain, the one or more execution domains, or the frontend domain.

19. The apparatus of claim 8, further comprising a plurality of first-in, first-out buffers to synchronize communication among the plurality of clock domains.

20. The apparatus of claim 8, wherein the processor comprises a plurality of cores on a same die.

21. The apparatus of claim 8, further comprising a first storage unit to store the speculative output in response to a first clock edge and a second storage unit to store the correct output in response to a second clock edge.

22. The apparatus of claim 21, wherein the first and second clock edges are edges of the clock signal.

23. A processor comprising:
   a first domain to receive a first clock signal;
   a second domain to receive a second clock signal;
   one or more sensors to detect one or more variations within the first domain and the second domain;
   a first logic to adjust a frequency of the first clock in response to the one or more variations within the first domain;
   a second logic to adjust a frequency of the second clock in response to the one or more variations within the second domain; and
   a comparison logic to compare a speculative output of a pipeline stage of the processor with a correct output of the pipeline stage of the processor to determine whether the speculative output matches the correct output.

24. The processor of claim 23, further comprising one or more buffers to synchronize communication between the first and second domains.

25. A computing system comprising:
   one or more domains, each domain comprising:
      logic to perform one or more computing functions;
      one or more sensors coupled to one or more components of the logic to perform the one or more computing functions, the one or more sensors to sense variations within a corresponding domain;
      a frequency controller coupled to the logic to perform the one or more computing functions and the one or more sensors, the frequency controller to adjust a frequency of a clock signal for the corresponding domain in response to one or more of timing errors or variations; and a comparison logic to compare a speculative output of a pipeline stage of a processor with a correct output of the pipeline stage of the processor to determine whether the speculative output matches the correct output.

26. The computing system of claim 25, wherein the one or more computing functions comprise one or more of data processing, data storage, and data communication.

27. The computing system of claim 25, wherein the computing system comprises at least one computing device selected from a group comprising of a personal digital assistant (PDA), a mobile phone, a laptop computer, a desktop computer, a server computer, and a workstation.

* * * * *